(12) United States Patent
Mayell et al.

(10) Patent No.: US 9,036,369 B2
(45) Date of Patent: May 19, 2015

(54) PROGRAMMING OF AN INTEGRATED CIRCUIT ON A MULTI-FUNCTION TERMINAL

(71) Applicant: Power Integrations, Inc., San Jose, CA (US)

(72) Inventors: Robert Mayell, Los Altos, CA (US); Yury Gaknoki, Mountain View, CA (US); Mingming Mao, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 264 days.

(21) Appl. No.: 13/651,298

(22) Filed: Oct. 12, 2012

(65) Prior Publication Data

US 2014/0104887 A1  Apr. 17, 2014

(51) Int. Cl.
*H02M 3/00* (2006.01)
*H02M 3/335* (2006.01)
*H02M 1/00* (2006.01)
*H02M 3/28* (2006.01)

(52) U.S. Cl.
CPC ............ *H02M 3/28* (2013.01); *H02M 3/33515* (2013.01)

(58) Field of Classification Search
USPC ............. 363/15, 16, 21.01–21.18, 24, 49, 89, 363/97–98, 127
See application file for complete search history.

(56) References Cited

U.S. PATENT DOCUMENTS

| | | | | |
|---|---|---|---|---|
| 5,995,384 A | * | 11/1999 | Majid et al. ................. | 363/21.18 |
| 6,208,123 B1 | * | 3/2001 | Sudo ............................. | 323/280 |
| 6,249,410 B1 | * | 6/2001 | Ker et al. ......................... | 361/56 |
| RE40,656 E | * | 3/2009 | Yang et al. ................. | 363/21.15 |
| 7,859,869 B2 | * | 12/2010 | Mayell ........................ | 363/56.01 |
| 8,533,508 B2 | * | 9/2013 | Chang et al. .................... | 713/320 |
| 8,767,414 B2 | * | 7/2014 | Baurle et al. .................... | 363/16 |
| 2005/0024898 A1 | * | 2/2005 | Yang et al. ................. | 363/21.12 |
| 2005/0213355 A1 | * | 9/2005 | Koike ......................... | 363/21.16 |
| 2007/0058398 A1 | * | 3/2007 | Yang et al. ....................... | 363/16 |
| 2008/0186747 A1 | * | 8/2008 | Balakrishnan et al. ......... | 363/84 |
| 2009/0109718 A1 | * | 4/2009 | Wu et al. ....................... | 363/147 |
| 2009/0160415 A1 | * | 6/2009 | Polivka ........................ | 323/284 |
| 2010/0067262 A1 | * | 3/2010 | Chen et al. ................. | 363/21.06 |
| 2010/0165524 A1 | * | 7/2010 | Lim ................................ | 361/56 |
| 2010/0302815 A1 | * | 12/2010 | Li et al. ..................... | 363/21.09 |
| 2011/0051463 A1 | * | 3/2011 | Chen et al. ..................... | 363/19 |
| 2011/0063880 A1 | * | 3/2011 | Mayell ....................... | 363/21.18 |
| 2011/0085360 A1 | * | 4/2011 | Balakrishnan et al. ......... | 363/50 |
| 2011/0175587 A1 | * | 7/2011 | Hosotani ...................... | 323/283 |
| 2011/0194310 A1 | * | 8/2011 | Mayell ...................... | 363/21.11 |

(Continued)

Primary Examiner — Timothy J Dole
Assistant Examiner — Yusef Ahmed
(74) Attorney, Agent, or Firm — Morrison & Foerster LLP

(57) ABSTRACT

Methods and apparatuses for programming a parameter value in an IC (e.g., any power electronic device, such as a controller of a power converter) are disclosed. The parameter can be selected/programmed by selecting a clamp using an external optional (selectively inserted) diode coupled to a multi-function programming terminal. In particular, a controller IC for a power converter can be externally programmed via one or more multiple function terminals during startup of the converter to select between two or more options using the external programming terminal(s). Once programming is complete, internal programming circuitry may be decoupled from the programming terminal and during normal operation the programming terminal may then be used for another function, such as a bypass (BP) terminal to provide a supply voltage to the IC or other required functionalities.

24 Claims, 8 Drawing Sheets

(56) References Cited

U.S. PATENT DOCUMENTS

| | | | |
|---|---|---|---|
| 2011/0234184 A1* | 9/2011 | Hong et al. | 323/277 |
| 2011/0235222 A1* | 9/2011 | Hong et al. | 361/42 |
| 2011/0286252 A1* | 11/2011 | Cui | 363/131 |
| 2012/0008346 A1* | 1/2012 | Kawamura | 363/21.15 |
| 2012/0250360 A1* | 10/2012 | Orr et al. | 363/21.02 |
| 2012/0287682 A1* | 11/2012 | Zhang et al. | 363/21.16 |
| 2012/0320640 A1* | 12/2012 | Baurle et al. | 363/21.17 |
| 2013/0027815 A1* | 1/2013 | Gaknoki et al. | 361/18 |
| 2013/0083579 A1* | 4/2013 | Gaknoki et al. | 363/131 |
| 2013/0223175 A1* | 8/2013 | Lee | 365/228 |
| 2013/0250457 A1* | 9/2013 | Gaknoki et al. | 361/18 |

* cited by examiner

PROGRAMMING OF AN INTEGRATED CIRCUIT ON A MULTI-FUNCTION TERMINAL

BACKGROUND

1. Field

The present disclosure relates generally to Integrated Circuits (ICs) in power electronics and, in particular but not exclusively, relates to programming controllers for switch mode power converters.

2. Description of Related Art

Many power electronic IC devices allow selection among two or more functional parameters of the device. Conventional programming methods program these IC devices using resistors or capacitors placed at dedicated terminals of the device. Thus, to program the IC devices, additional terminals may be added to the device for each additional function or programmable parameter, which may translate into increased cost, power consumption, and space required by the device.

One example implementation of an IC having selectable parameters is as a controller for a switch mode power converter. For example, many household and industrial applications require a regulated direct current (dc) power to operate. Since conventional wall outlets generally deliver a high voltage alternating current (ac) power, a power converter, such as a switch mode power converter, is commonly used to transform the ac power into a dc power. These switch mode power converters can be used to convert a low frequency (e.g., 50 Hz or 60 Hz) high voltage ac input voltage to the required level of dc output voltage. Generally, these converters include an IC controller that switches a power switch between an ON state and an OFF state to control the amount of power transmitted to the output of the converter. Various types of switch mode power converters are popular for this use because of their well regulated output, high efficiency, small size, low weight, and their safety and protection features.

Output regulation in a switch mode power converter is usually provided by sensing a feedback signal from the output of the converter and controlling the power converter in a closed loop. The feedback or control signal can be provided by an opto-coupler from a sense circuit coupled to the dc output of the converter or can be extracted indirectly from a third winding magnetically coupled to the secondary winding on the same transformer core. In different control methods, the feedback or control signal may be used to modulate a duty cycle of a switching waveform (referred to as pulse width modulation (PWM)), to change a switching frequency (referred to as pulse frequency modulation (PFM), or to disable some of the cycles of the switching waveform generated by the power converter controller to control the dc output versus load and line variations (referred to as on-off control).

DESCRIPTION OF THE FIGURES

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Methods and apparatuses for programming a parameter value in an IC (e.g., a controller for a power converter) using an external diode (or a diode plus a resistor) coupled to a multi-function programming terminal are disclosed. In particular, a controller IC for a power converter can be externally programmed via one or more multiple function terminals to select between two or more options using the same external programming terminal. For example, a user may select a desired setting of the controller, such as switching frequency during the startup of the power supply, by selectively coupling a diode (or a diode plus a resistor) to a programming terminal of the controller. Once programming is complete, internal programming circuitry may be decoupled from the programming terminal. Then, during the normal operation of the power converter, the programming terminal may be used for another function, such as a bypass (BP) terminal to provide a supply voltage to the controller or other required functionalities. By using a common terminal and internal circuit components for two or more functions of the controller, the size and amount of power used by the controller and associated programming circuitry can be reduced.

Figure 1A:
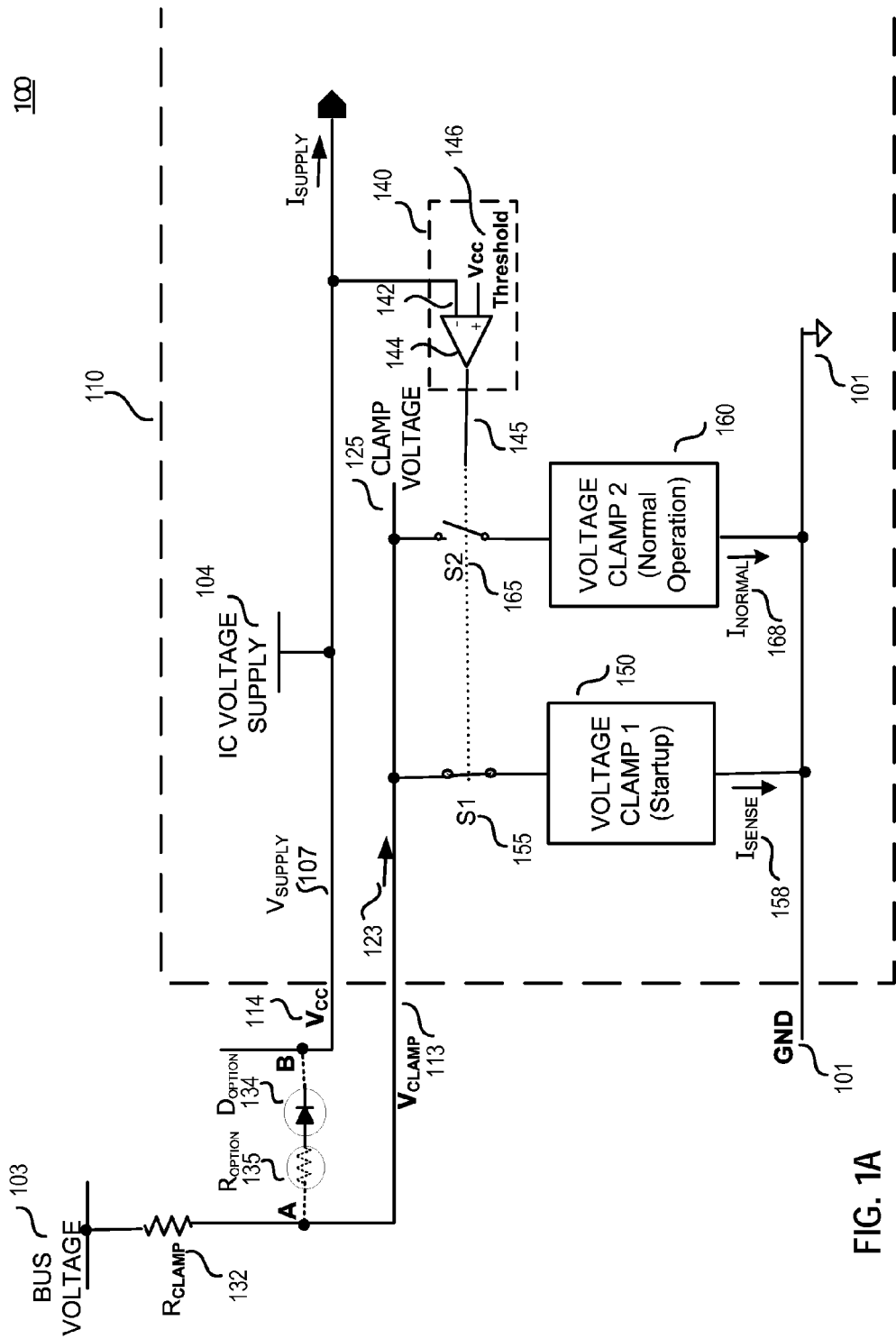
FIGS. 1A and 1B illustrate simplified block diagrams of an example IC having a multi-function terminal that allows parameter selection by insertion of a diode (or a diode plus a resistor) across the multi-function terminal according to various embodiments.
Figure 1B:
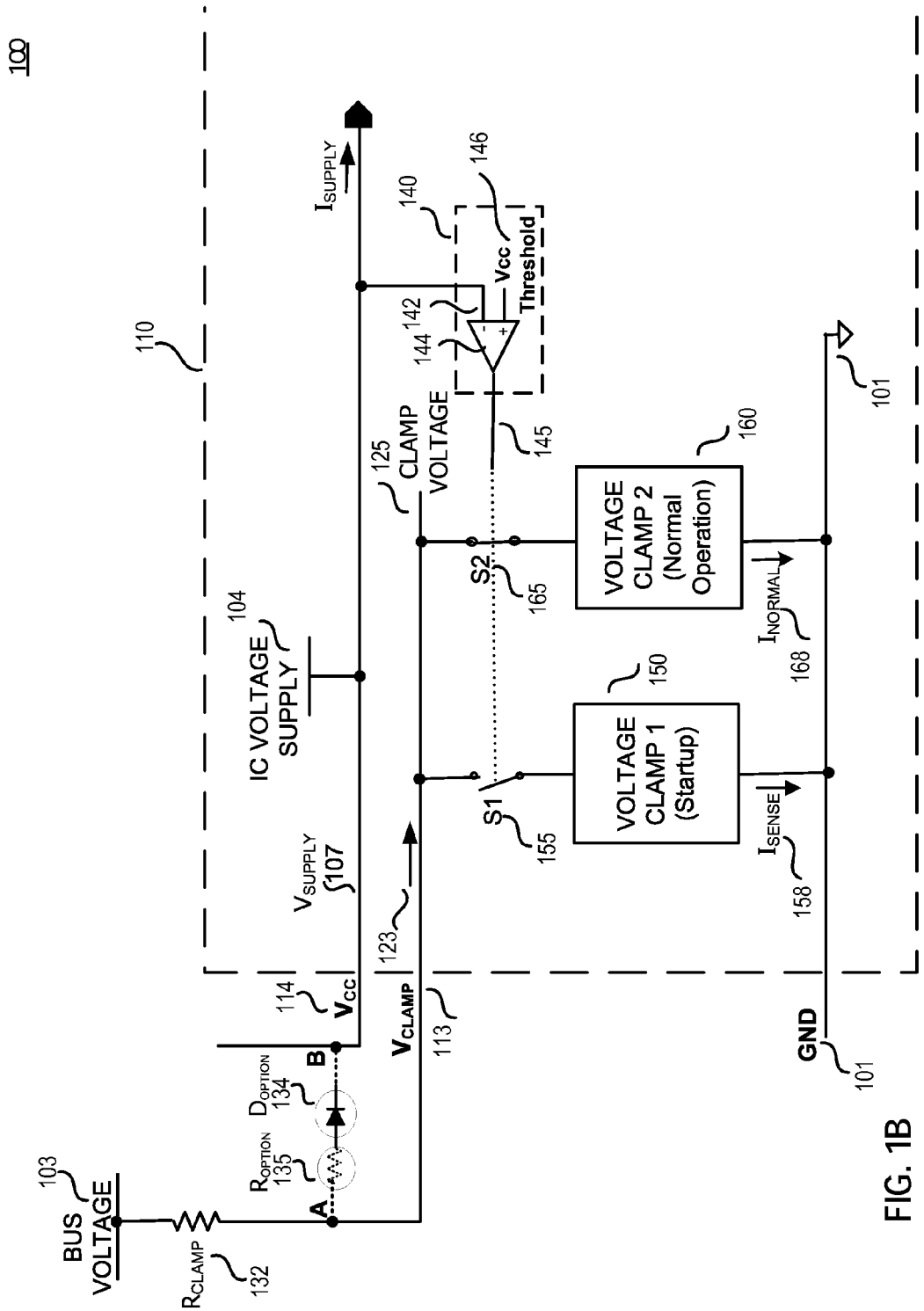

FIGS. 1A and 1B illustrate an example system 100 that can be used to program any IC 110 to be used for power electronic applications according to various embodiments. In particular, FIG. 1A illustrates system 100 during a startup condition and FIG. 1B illustrates the same system 100 during a normal operation condition.

Referring first to FIG. 1A, in some examples, system 100 may include IC 110 having a multi-function voltage clamp terminal $V_{CLAMP}$ 113 coupled to bus supply voltage 103 (e.g., a high voltage bus supply) through a clamping resistor $R_{CLAMP}$ 132. Clamping resistor $R_{CLAMP}$ 132 can be used to clamp the voltage at terminal $V_{CLAMP}$ 113 by sinking a current 123 through either clamp circuit 1, 150 during startup, or clamp circuit 2, 160 during normal operation. IC 110 may further include IC supply terminal Vcc 114 coupled to the IC supply voltage 104. System 100 may further include an optional diode (or a diode plus a resistor; $D_{option}$ 134 plus $R_{option}$ 135) coupled across the two terminals $V_{CLAMP}$ 113 and Vcc 114. Diode $D_{option}$ 134 or diode $D_{option}$ 134 plus resistor $R_{option}$ 135 may be used to program IC 110 by selectively triggering voltage clamp 1, 150 to output sense signal $I_{SENSE}$ 158.

System 100 may further include a clamp selection circuit 140 for selectively coupling voltage clamp 1, 150 and voltage clamp 2, 160 to terminal $V_{CLAMP}$ 113 by opening and closing switches S1 155 and switch S2 165. Switch control circuit 140 may include comparator 144 having an inverting input 142 coupled to supply voltage 104 via terminal Vcc 114 and a non-inverting input coupled to threshold voltage $V_{CC\ threshold}$. In this configuration, comparator 144 may be used to compare the voltage at IC supply terminal Vcc 114 with the threshold voltage $V_{CC\ threshold}$.

During a selection condition (e.g., during startup of the converter), the voltage at IC supply terminal Vcc 114 may be below the threshold voltage $V_{CC\ threshold}$ 146 (e.g., approximately 5.8 V). As a result, output signal 145 output by comparator 144 may be at a high signal level, which may cause switch S1 155 to close and switch S2 165 to open. Also at startup, the voltage at terminal $V_{CLAMP}$ 113 and point A may be pulled up to the bus supply voltage 103 and the relationship between voltages at points A and B may be: $V_A > (V_B + V_{option})$, wherein $V_{option}$ is the forward voltage drop across $D_{option}$ 134 or the voltage across $D_{option}$ 134 and $R_{option}$ 135. If diode $D_{option}$ 134 (or diode $D_{option}$ 134 plus $R_{option}$ 135) is not present (not externally inserted), then current 123 may pass through terminal $V_{CLAMP}$ 113 to clamp the voltage at bus 125 and may also activate voltage clamp 1, 150 through switch S1 155, resulting in sense signal $I_{SENSE}$ 158 having a value greater than zero (or another threshold value). If, during startup (or in a small timing window during start up), the sense signal $I_{SENSE}$ is determined to have a value greater than zero (or another threshold value), then a first value of a parameter of IC 110 may be selected. Alternatively, if diode $D_{option}$ 134 (or diode $D_{option}$ 134 plus $R_{option}$ 135) is present (externally inserted), then during startup due to forward bias of the diode $D_{OPTION}$ 134 caused by $V_A > (V_B + V_{option})$, current may be conducted through diode $D_{option}$ 134 (or diode $D_{option}$ 134 plus $R_{option}$ 135) to terminal $V_{CC}$ 114. As a result, voltage clamp 1, 150 may not be activated, causing sense signal $I_{SENSE}$ to be equal to zero (or at or below another threshold value). If, during startup (or in a small timing window during start up), the sense signal $I_{SENSE}$ is determined to have a value equal to zero (or at or below another threshold value), then a second value (or another optional value) of a parameter of IC 110 may be selected.

Referring now to FIG. 1B illustrating normal operation of the converter, the voltage at terminal Vcc 114 may have risen to a value greater than that of the threshold voltage $V_{CC\ threshold}$ 146 (e.g., voltage at $V_{cc} \geq 5.8V$). As a result, the control signal 145 output by comparator 144 may cause switch S1 155 to open and switch S2 165 to close. The opening and closing of switches S1 155 and S2 165, respectively, may cause deactivation of Voltage Clamp 1, 150 (e.g., used for startup monitoring) and may cause activation of voltage clamp 2, 160. Voltage clamp 2, 160 may then output sinking current $I_{NORMAL}$ 168, resulting in a voltage clamp being applied at terminal $V_{CLAMP}$ 113, where $V_A \ll V_B$. In this condition, even if diode $D_{option}$ 134 (or diode $D_{option}$ 134 plus $R_{option}$ 135) is present, it would be reverse biased and may thus have no effect on the circuit.

Figure 1C:
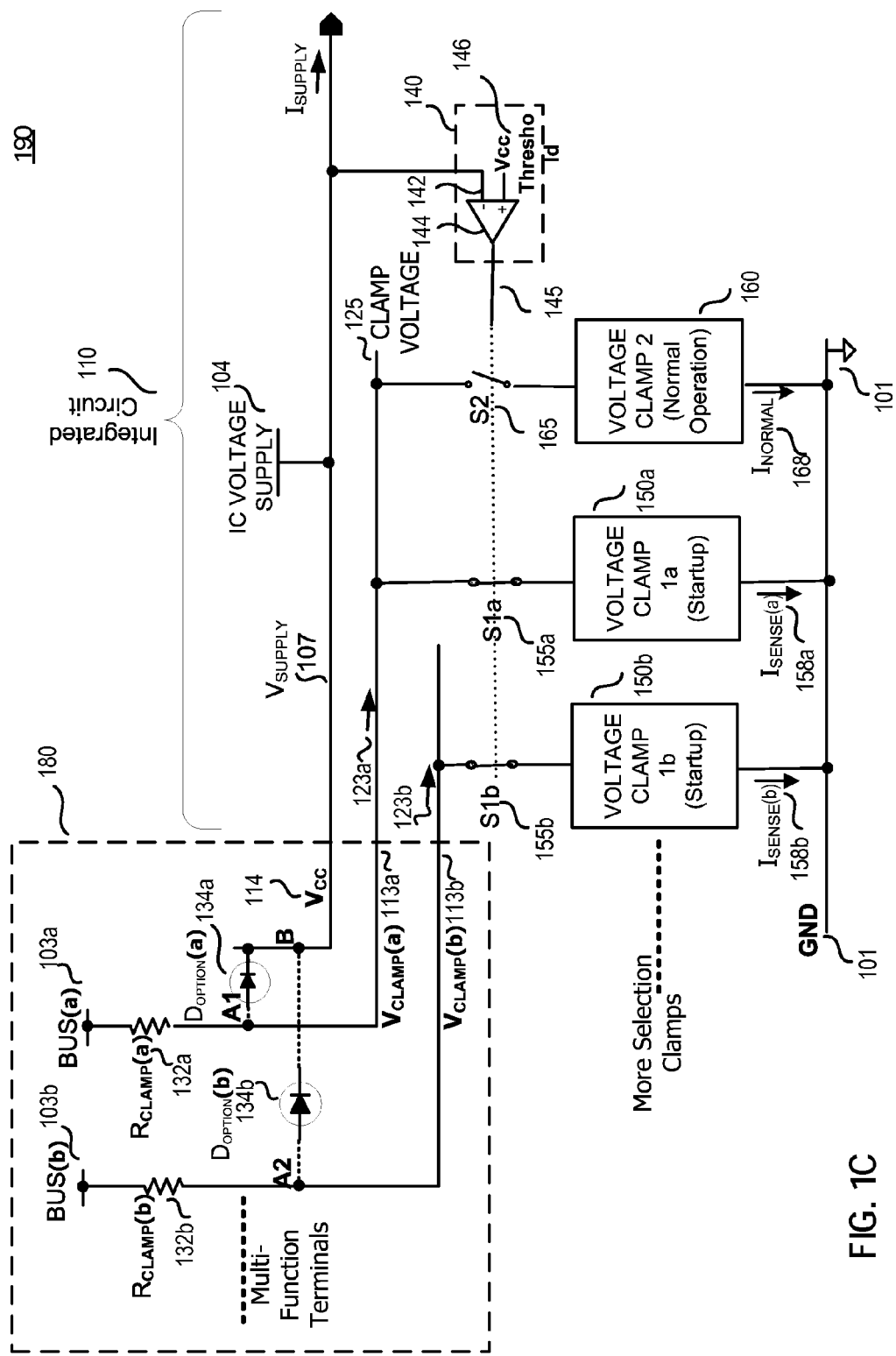
FIG. 1C illustrates a simplified block diagram of another example IC having multiple multi-function terminals that allow parameter selection by insertion of diodes (or diodes plus resistors) across the multi-function terminals according to various embodiments.

FIG. 1C illustrates another example system 190 that can be used to program any IC 110 to be used for power electronic applications according to various embodiments. System 190 includes IC 110 having multiple multi-function programming terminals that, through the selectively inserted external diodes from each programming terminal to the common terminal, individual voltage clamp and individual sense current, can be used to program the IC parameters. By including additional programming terminals, IC 110 can be programmed with more than two parameter values. Similar to FIG. 1A, FIG. 1C illustrates system 190 during a startup condition. System 190 is similar to system 100, except that in block 180 of system 190, two optional diodes $D_{option}(a)$ 134a and $D_{option}(b)$ 134b can selectively be inserted from point A1 on terminal $V_{clamp}(a)$ 113a, or from point A2 on terminal $V_{clamp}(b)$ 113b to the common point B on terminal $V_{CC}$ 114. Terminals $V_{clamp}(a)$ 113a and terminal $V_{clamp}(b)$ 113b are coupled to bus(a) 103a and Bus(b) 103b through clamping resistors $R_{clamp}(a)$ 132a and $R_{clamp}(b)$ 132b, respectively. Each multi-function terminal $V_{clamp}(a)$ 113a and $V_{clamp}(b)$ 113b can conduct current 123a and 123b to the blocks of voltage clamp 1a (150a) and voltage clamp 1b (150b) during startup through the closed switches S1a 155a and S1b 155b, respectively. Specifically, voltage clamp 1a (150a) can operate in a manner similar to that of voltage clamp 1 (150), described above. Further, when switch S1b 155b is closed, voltage clamp 1b, 155b may then output sinking current $I_{SENSE(b)}$ 158b, resulting in a voltage clamp being applied at terminal $V_{CLAMP(b)}$ 113b, where $V_{A2} \ll V_B$. In this condition, even if diode $D_{option(b)}$ 134b (or diode $D_{option(b)}$ 134b plus a resistor) is present, it would be reverse biased and may thus have no effect on the circuit. Decoding detection of clamp currents $I_{sense}(a)$ 158a and $I_{sense}(b)$ 158b defines the parameter values.

It is appreciated that by adding more multi-function programming terminals and more voltage clamp blocks, more IC parameters could be programmed. It should also be appreciated that each selectively inserted diode could be replaced with a diode plus a resistor to provide more options of programming.

Figure 2:
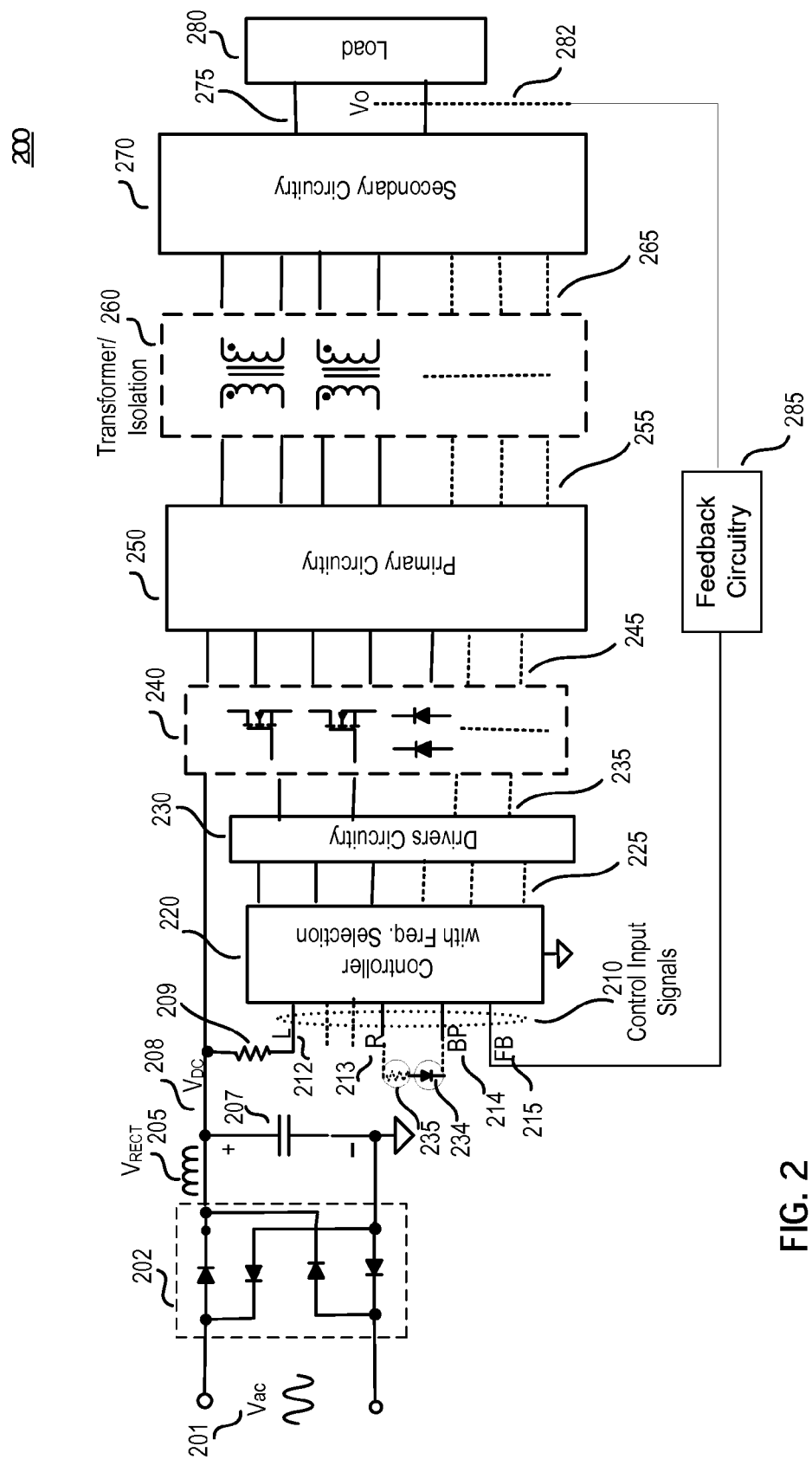
FIG. 2 illustrates a simplified block diagram of an example switch mode power converter including a controller having a multi-function terminal for programming a parameter of the controller according to various embodiments.

FIG. 2 illustrates a simplified block diagram of an example switch mode power converter 200 coupled to receive ac input voltage $V_{ac}$ 201 and output dc output voltage $V_O$. Power converter 200 may include rectifier bridge 202 configured to generate a full-wave rectified voltage $V_{RECT}$ 205 across capacitor 207 to generate a dc voltage $V_{DC}$ on dc bus 208 that may be provided to switcher 240 and primary circuitry 250. Switcher 240 may include switching devices coupled through coupling 245 to primary circuitry 250 that, in turn, may be coupled through coupling 255 to the transformer/isolation block 260. Transformer/isolation block 260 may provide an isolated, scaled-down voltage coupled through coupling 265 to secondary circuitry 270. Secondary circuitry 270 may provide the output voltage Vo to load 280 via output coupling 275.

Power converter 200 may further include feedback circuitry 285. In one example, feedback circuitry 285 may include an opto-coupler. In another example, feedback circuitry 285 may include a third winding magnetically coupled to the secondary winding of transformer/isolation 260. In either example, feedback circuitry 285 may be coupled to provide a feedback signal representative of output voltage Vo to feedback terminal FB 215 of controller 220. Controller 220 may further be coupled to receive other control input signals 210, such as an input line sense signal received through line resistor 209 coupled to dc bus 208 and received at terminal L 212, a reset signal received at reset terminal R 213, and a supply voltage received at BP/programming terminal 214. BP/programming terminal 214 may be a multi-function terminal that may be used to provide a supply voltage to controller 220 and may also be used to program controller 220. As shown in FIG. 2, BP/programming terminal 214 may be coupled to reset terminal 213 by an external diode 234 (or diode 234 plus resistor 235) and may be programmed as described above with respect to FIGS. 1A, 1B, and 1C. It should be appreciated that based on the intended application of converter 200, controller 220 may include additional terminals coupled to receive additional input signals.

In some examples, converter 200 may be a single switch or a double-switch forward converter. In other examples, converter 200 may be a converter having a different topology. It should be appreciated that the techniques described herein may be implemented with any of these or other converter topologies.

Figure 3:
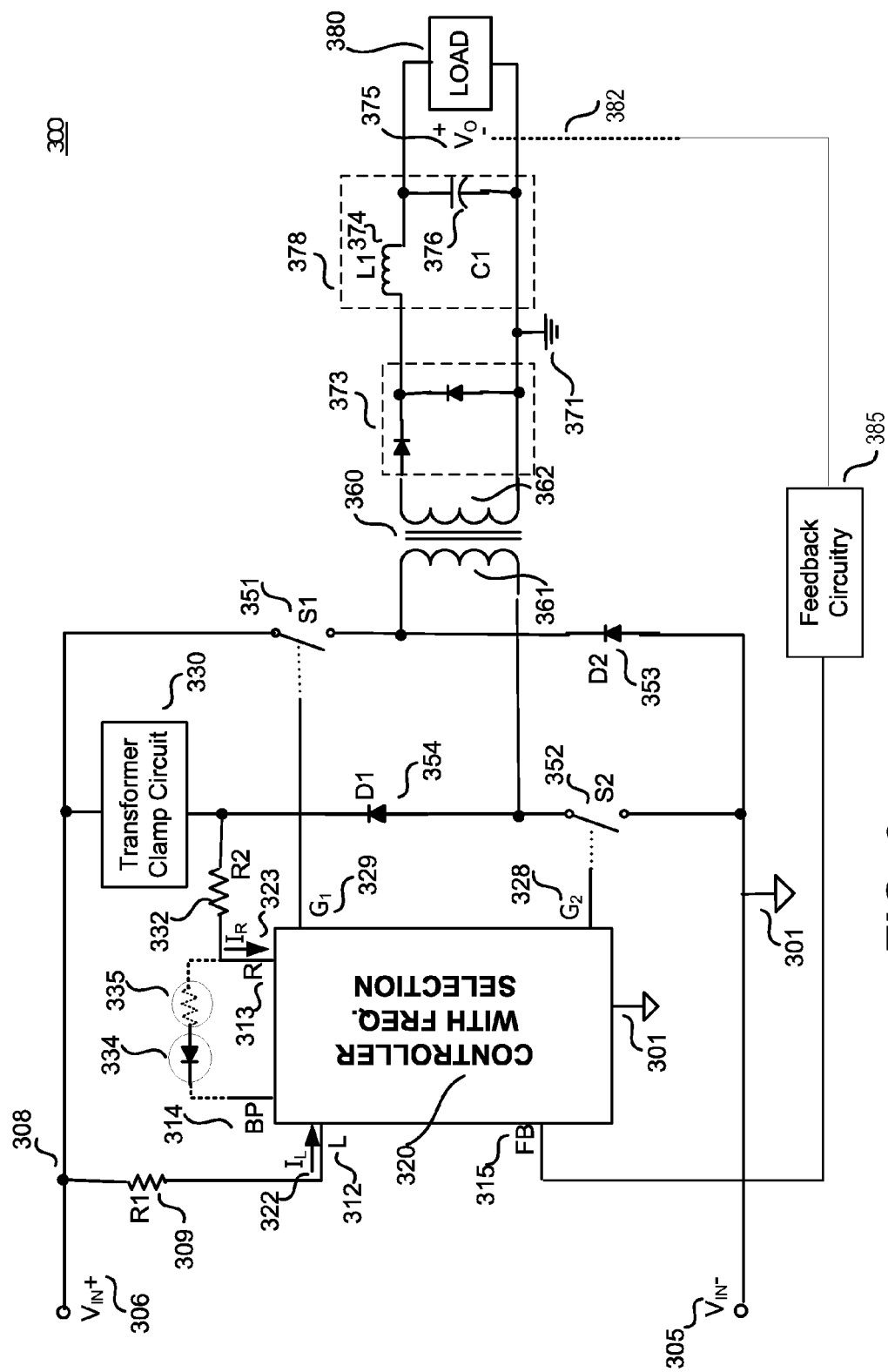
FIG. 3 illustrates an example double-switch forward converter with a transformer clamp circuit (which may also be referred to herein as a flux reset circuit) that includes a controller having frequency selection by an external programming diode (or a diode plus a resistor) across the multi-function terminals (e.g., a reset terminal and a bypass/program terminal) in accordance with the teachings of the present disclosure.

FIG. 3 illustrates one example converter 300 in which a programmable controller IC according to various embodiments can be used. Specifically, FIG. 3 illustrates an example double-switch forward converter 300 having a transformer clamp circuit 330, such as that described in U.S. Pat. No. 7,859,869. Transformer clamp circuit 330 may be positioned in the path of the reset current. Converter 300 may further include active switches S1, 351 and S2, 352 configured to turn ON and OFF simultaneously (or at substantially similar times) in response to the in-phase control gate signals $G_1$ 329 and $G_2$ 328, respectively. As a result, the dc bus voltage 308 (across Vin+, 306 and Vin−, 305) may be selectively applied to the primary winding 361 of transformer 360, while secondary winding 362 of transformer 360 may transfer the energy from primary side of transformer 360 to load 380 through the secondary rectifier 373 during the ON time of active switches S1, 351 and S2, 352. Secondary rectifier 373 may introduce a center-tap full-wave rectification that may be followed by a filter circuit 378 having inductor L1, 374 and capacitor C1, 376. Regulation of the output may be accomplished through sensing of the output $V_O$ 375 by feedback circuitry 385. Feedback circuitry 385 may provide a feedback signal to feedback terminal FB 315 of controller 320. Controller 320 may further be coupled to receive an input line sense signal at terminal L 312 received through line resistor 309.

Gating signals G1 329 and G2 328 may be generated by controller 320 with frequency selection to control the turning on and off of switches S1 351 and S2 352. Gating signals G1 329 and G2 328 may be in phase and configured to simultaneously (or at substantially similar times) cause switches S1 351 and S2 352 to turn ON/OFF using various control signals. In some examples, controller 320 may generate gating signals G1 329 and G2 328 based on the feedback signal received at FB terminal 315, the input line sense signal $I_L$ 322 received at terminal L 213 through resistor R1 309, and the current $I_R$ 323 received at terminal R 313 via resistor R2 332. Controller 320 may further include multi-function BP/programming terminal BP 314 coupled to receive the supply voltage for the controller and that optionally provides programming and selection of some function parameters, such as switching frequency, current limit, and the like.

Converter 300 may further include passive switches (e.g., diodes D1, 354 and D2, 353) that, during OFF times of active switches S1, 351 and S2, 352, may transfer the remaining energy in the core of transformer 360 back to dc bus 308 through transformer clamp circuit 330. This may provide the reset information to the controller 320 to adjust the next duty cycle to prevent core saturation.

Controller 320 may receive current 322 from dc input line 308 through a resistor R1 309 at terminal L 312. Current 322 may represent the dc bus voltage level Vin+, 306. As discussed above with respect to FIGS. 1A, 1B, 1C, and 2, selection of the intended parameter of controller 320 may be accomplished by adding an optional programming diode 334 (or diode 334 plus resistor 335) across reset terminal R 313 and BP/programming terminal BP 314. In particular, at startup, when the voltage at terminal BP 314 is still below a threshold voltage (e.g., approximately 5.8V), a current can be conducted through the rectifier diode 334 (or diode 334 plus resistor 335) and the forward voltage drop across the diode 334 (or diode 334 plus resistor 335) can be utilized for programming and selection of controller parameter.

Figure 4:
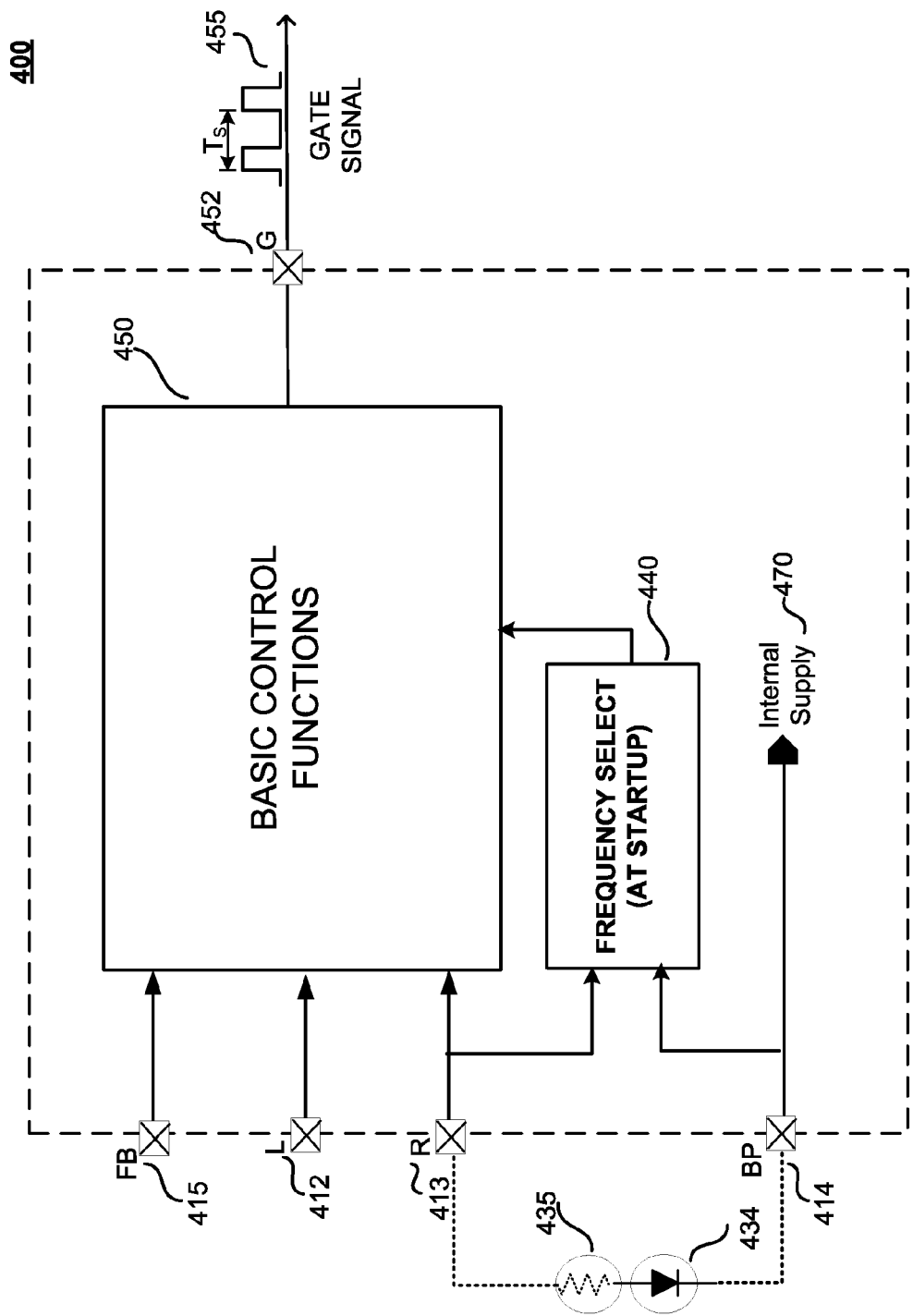
FIG. 4 illustrates a simplified block diagram of an example controller that may be programmed by an external diode (or a diode plus a resistor) applied across the reset terminal and the bypass/program terminal.

FIG. 4 illustrates a simplified block diagram of the internal components of an example controller 400 that may be used as controller 220 or 320. Controller 400 may be coupled to receive a feedback signal at terminal FB 415, an input line sense signal at terminal L 412, a reset signal at terminal R 413, and a BP/programming signal at multi-function terminal BP 414. As shown, controller 400 includes an optional external diode 434 (or diode 434 plus resistor 435) coupled between/across terminal R 413 and terminal BP 414 for selecting a parameter (e.g., frequency) at startup.

Controller 400 may include a section block 450 that represents basic control functions of the controller and, in one example, may include the oscillator and pulse width modulator block that in combination with duty adjust logic, receives signals via terminal FB 415, L 412, and terminal R 413 from feedback circuitry and transformer clamp circuitry to output the PWM gate signal 455 at output terminal 452 of the controller 400 to control a power switch of a controller.

Controller 400 further includes parametric selection circuitry, such as frequency select block 440, coupled to receive the reset signal via terminal R 413 and the BP/programing signal via multi-function terminal BP 414. Frequency select block 440 is operable to control the frequency fractioning or folding of the oscillator based on the signals received from terminals R 413 and BP 414.

Figure 5A:
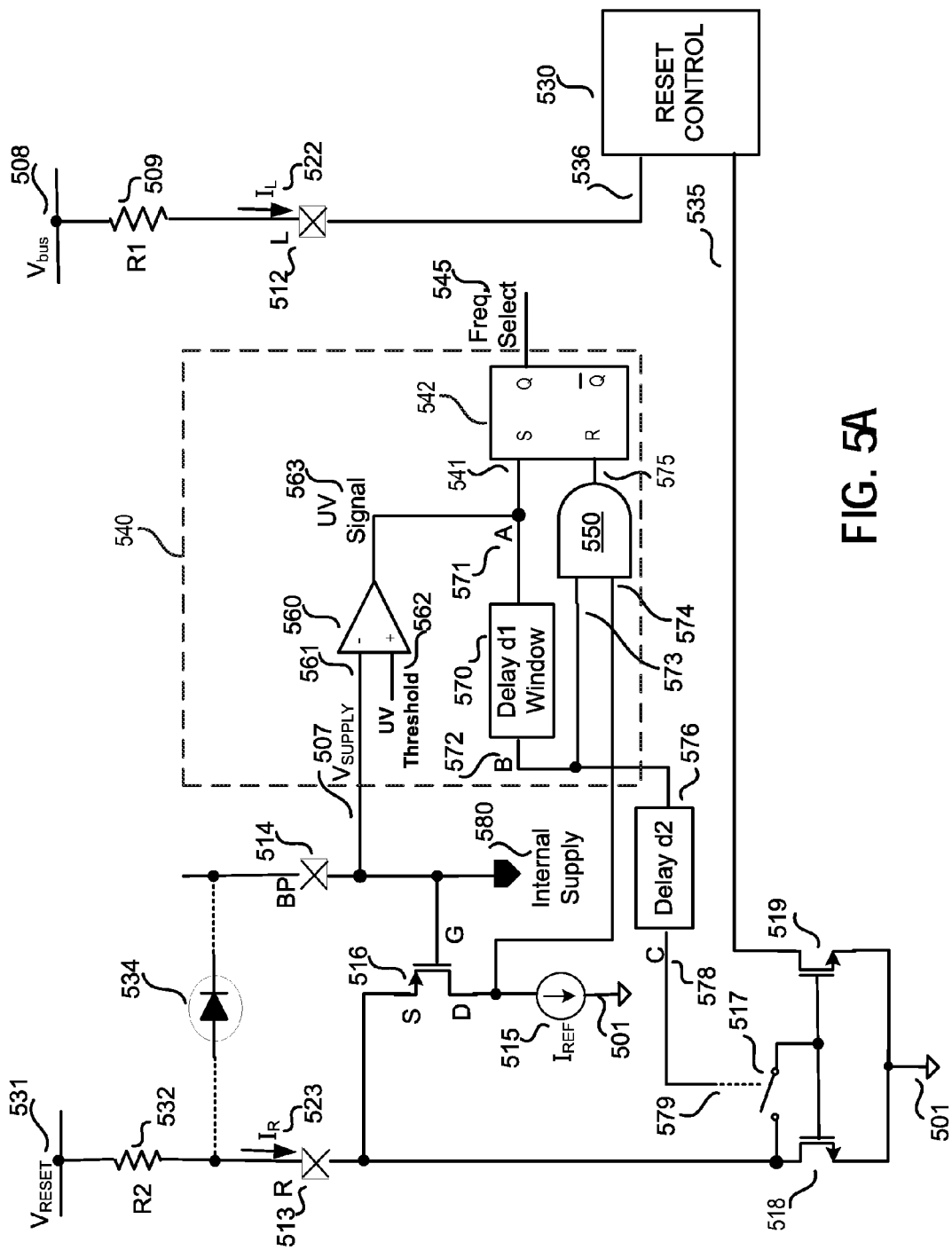
FIG. 5A illustrates a simplified circuit diagram of example internal/external block couplings and operation of a frequency select block during startup in accordance with the present disclosure.

FIG. 5A illustrates a simplified circuit diagram of example internal/external block couplings wherein insertion of a diode across terminals R 513 and BP 514 causes a selection between two options of an internal parameter (e.g., frequency selection) of a controller. Terminals R 513, BP 514, and L 512 correspond to R, BP, and L terminals in FIGS. 2-4). The components included within box 540 represent frequency select block 440 in FIG. 4. Terminal L 512 may be externally coupled to dc bus voltage $V_{bus}$ 508 through resistor R1 509. Terminal R 513 may be externally coupled to the reset voltage $V_{reset}$ 531 through resistor R2 532. At startup, the voltage at reset terminal R 513 may be equal to the line voltage and a small current $I_R$ 523 may be received at terminal R 513. The BP terminal 514 may provide the required internal supply 580 to power all of the IC blocks. At start up when switch 517 is open and NMOS 518 is turned off, the terminal R 513 could be limited in voltage by one of two paths either through PMOS 516 or by the externally inserted option diode 534. When the optional programming diode is coupled between terminal R 513 and terminal BP (bypass/program) 514, the forward drop of optional diode 534 is lower than the gate threshold voltage of PMOS 516, causing PMOS 516 to remain OFF. Thus, if optional diode 534 is present, the current through resistor R2 532 will be coupled through the optional diode 534 and clamped at terminal BP 514. If, on the other hand, the optional diode 534 is not present, voltage at terminal R is higher than voltage at terminal BP, then the PMOS 516 is turned ON and current through resistor R2 532 is instead coupled through the PMOS 516 sinking the current $I_{REF}$ 515 to ground 501. Turning on of PMOS 516 in turn generates a non-zero signal at input 574 of AND gate 550 that is the voltage at terminal 513 minus a small voltage drop across PMOS 516. The supply voltage $V_{supply}$ 507 applied to BP terminal 514 may be coupled to the inverting input 561 of comparator 560 and may be compared to an under voltage threshold UV threshold 562 (e.g., 5.8V) of the IC supply voltage $V_{supply}$ 507 that is coupled to the non-inverting input of the comparator 560. During startup, the UV signal 563 output by comparator 560 may be high and may be coupled to the terminal S 541 of latch 542. The high UV signal 563 may set the latch 542 such that the output Q of latch 542 (representing the frequency select signal 545) goes high for a short duration delay d1 window 570 when it is possible to reset the latch of 542 via AND gate 550. If the latch is not reset during the period d1, then output Q of the latch 542 will remain high. The output Q of the latch 542 (either high or low) represents two possible states for frequency select 545.

The UV signal 563 output by comparator 560 at point A 571 may also be coupled to a delay d1 window 570 having a delay value representing time interval/duration of sampling to recognize presence of the external diode 534. The delayed UV signal output by delay d1 window 570 may be applied to the second input 573 of the AND gate 550. AND gate 550 may output a high signal 575 when both inputs 573 and 574 are high, causing latch 542 to reset the output Q 545 of the latch 542. After startup and after the sampling condition (e.g., interval d1) has occurred and after another marginal delay d2 (caused by delay d2 576 to assure that frequency selection/programming has successfully finished), signal 579 at point C 578 closes switch 517 and activates the current mirror made up of diode connected NMOS 518 and the NMOS 519 referenced to ground 501 to begin normal operation of the converter (after completion of startup). At normal operation, the current through terminal R 513 may be mirrored and scaled down through the diode connected NMOS 518 and the NMOS 519. The scaled down current may be transferred to the input 535 of the reset control block 530 for the process of duty cycle adjustment to prevent flux saturation in each switching cycle. The reset control block 530 may receive the current $I_L$ 522 from terminal L 512 at a second input 536. The current $I_L$ 522 may represent the bus voltage $V_{bus}$ 508 through resistor R1 509.

It is appreciated that even though the parameter selection (in this example frequency selection) shown in FIG. 5A is accomplished by inserting a single diode across terminals R 513 and multi-function terminal BP 514 to select between two parameter options, other implementation examples known by someone skilled in the art can be implemented by inserting a combination of one or more diodes plus one or more resistors (as introduced in the general explanations of FIGS. 1 to 4) to select among multiple parameter options.

Figure 5B:
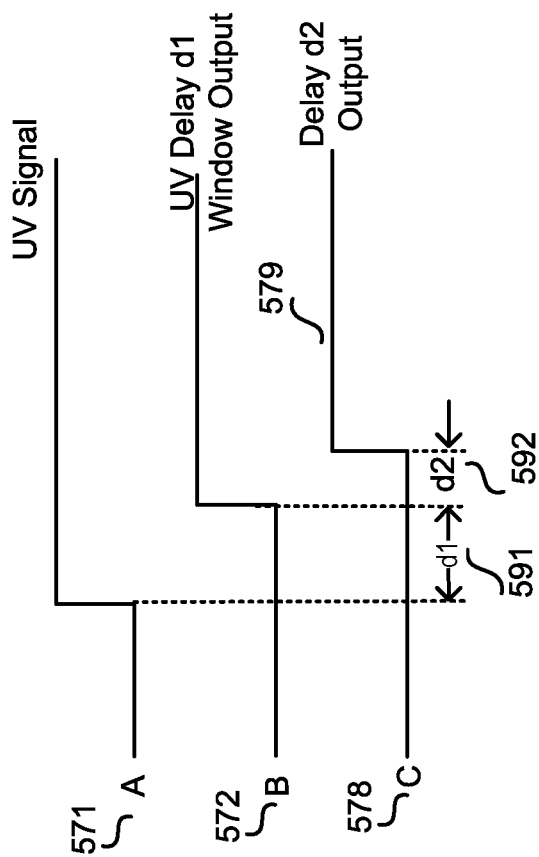
FIG. 5B illustrates a simplified timing diagram of the time delays between signals at different positions of the circuit in FIG. 5A.

FIG. 5B illustrates a sample timing diagram of the signal delays at points A 571, B 572, and C 578 (of FIG. 5A). Delay d1 591 at output of UV delay d1 window 570 provides the condition (e.g., time interval (duration)) for signal sampling at startup to verify presence of external diode 534. In one example, the sampling delay d1 (sampling window) is around 30 ns. The second marginal delay d2 592 may be included to assure that during startup, the frequency selection (programming) is completed and normal operation may start by closing switch 517 through the control signal 579.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An integrated circuit (IC) comprising:
a first terminal for receiving a first signal;
a second terminal for receiving a second signal;
a first voltage clamp;
a second voltage clamp; and
clamp selection circuitry operable to couple the second voltage clamp to the first terminal and decouple the first voltage clamp from the first terminal in response to a voltage of the second signal being greater than a threshold voltage, wherein the clamp selection circuitry is further operable to couple the first voltage clamp to the first terminal and decouple the second voltage clamp from the first terminal in response to the voltage of the second signal not being greater than the threshold voltage, and wherein the first voltage clamp is configured to output the sinking current having a second value during the selection condition when a diode is coupled in series with a resistor between the first terminal and the second terminal, wherein a cathode of the diode is coupled to the second terminal when the diode is coupled in series with the resistor between the first terminal and the second terminal.

2. The IC of claim 1, wherein the second signal is received at the second terminal from a voltage supply of the IC.

3. The IC of claim 1, wherein the voltage of the second signal is not greater than the threshold voltage during a selection condition.

4. The IC of claim 3, wherein the first voltage clamp is configured to output a sinking current having a first value during the selection condition when a diode is not coupled between the first terminal and the second terminal.

5. The IC of claim 4, wherein the first voltage clamp is configured to output the sinking current having a second value during the selection condition when a diode is coupled between the first terminal and the second terminal, wherein a cathode of the diode is coupled to the second terminal when the diode is coupled between the first terminal and the second terminal.

6. The IC of claim 3, wherein the selection condition comprises a startup condition prior to a normal operation condition of the IC.

7. The IC of claim 1, wherein the IC is configured to select between a plurality of parametric selections based at least in part on the value of the sinking current output by the first voltage clamp, and wherein the value of the sinking current is based at least in part on a resistance value of the series resistor.

8. The IC of claim 1, wherein during a normal operation condition, the voltage of the second signal is greater than the threshold voltage.

9. The IC of claim 8, wherein during the normal operation condition, a voltage of the first signal is clamped by the second voltage clamp to a voltage below the voltage of the second signal during the normal operation condition.

10. The IC of claim 1 further comprising:
a third terminal for receiving a third signal; and
a third voltage clamp, wherein the clamp selection circuitry is further operable to selectively couple the third voltage clamp to the third terminal based at least in part on the second signal received at the second terminal.

11. The IC of claim 10, wherein the third voltage clamp is configured to output a sinking current having a first value during a selection condition when a diode is not coupled between the third terminal and the second terminal.

12. The IC of claim 11, wherein the third voltage clamp is configured to output the sinking current having a second value during the selection condition when the diode is coupled between the third terminal and the second terminal, wherein a cathode of the diode is coupled to the second terminal when the diode is coupled between the third terminal and the second terminal.

13. The IC of claim 12, wherein during a normal operation condition, a voltage of the third signal is clamped by the third voltage clamp to a voltage below the voltage of the second signal during the normal operation condition.

14. A controller for a power converter comprising:
a first terminal for receiving a first signal;
a second terminal for receiving a second signal;
a first voltage clamp;
a second voltage clamp; and
a parametric selection circuit comprising a clamp selection circuit operable to couple the second voltage clamp to the first terminal and decouple the first voltage clamp from the first terminal in response to a voltage of the second signal being greater than a threshold voltage, wherein the clamp selection circuit is further operable to couple the first voltage clamp to the first terminal and decouple the second voltage clamp from the first terminal in response to the voltage of the second signal not being greater than the threshold voltage, and wherein the parametric selection circuit is operable to select between a plurality of parameters of the controller based at least in part on an output of the first voltage clamp, wherein the first voltage clamp is configured to output a sinking current having a first value during a selection condition when a diode is not coupled between the first terminal and the second terminal, and wherein the first voltage clamp is configured to output the sinking current having a second value during the selection condition when the diode is coupled between the first terminal and the second terminal, a cathode of the diode being coupled to the second terminal when the diode is coupled between the first terminal and the second terminal.

15. The controller of claim 14, wherein the plurality of parameters comprises a plurality of switching frequencies of a gate signal.

16. The controller of claim 14, wherein the parametric selection circuit is operable to select a first parameter of the plurality of parameters when the sinking current has the first value, and wherein the parametric selection circuit is operable to select a second parameter of the plurality of parameters when the sinking current has the second value.

17. A power converter comprising:
a power switch;
an energy transfer element coupled to the power switch to galvanically isolate an input of the power converter from an output of the power converter and to transfer energy between the input and output of the power converter; and
a controller comprising:
a first terminal for receiving a first signal;
a second terminal for receiving a second signal;
a first voltage clamp;
a second voltage clamp; and
a parametric selection circuit comprising a clamp selection circuit operable to couple the second voltage clamp to the first terminal and decouple the first voltage clamp from the first terminal in response to a voltage of the second signal being greater than a threshold voltage, wherein the clamp selection circuit is further operable to couple the first voltage clamp to the first terminal and decouple the second voltage clamp from the first terminal in response to the voltage of the second signal not being greater than the threshold voltage, and wherein the parametric selection circuit is operable to select between a plurality of parameters of the controller based at least in part on an output of the first voltage clamp, wherein the first voltage clamp is configured to output a sinking current having a first value during a selection condition when a diode is not coupled between the first terminal and the second terminal, and wherein the first voltage clamp is configured to output the sinking current having a second value during the selection condition when the diode is coupled between the first terminal and the second terminal, a cathode of the diode being coupled to the second terminal when the diode is coupled between the first terminal and the second terminal.

18. The power converter of claim 17, wherein the power converter is a forward converter.

19. The power converter of claim 18, wherein the first terminal is a reset terminal, and wherein the second terminal is a multi-function bypass and programming terminal.

20. The power converter of claim 17, wherein the parametric selection circuit is operable to select a first parameter of the plurality of parameters when the sinking current has the first value, and wherein the parametric selection circuit is operable to select a second parameter of the plurality of parameters when the sinking current has the second value.

21. A controller for a power converter comprising:
a first terminal for receiving a first signal;
a second terminal for receiving a second signal;

a first transistor coupled to the first terminal;
a second transistor coupled to the first terminal; and
a parametric selection circuit comprising selection circuitry operable to turn on the second transistor and turn off the first transistor in response to a voltage of the second signal being greater than a threshold voltage, wherein the selection circuit is further operable to turn on the first transistor and turn off the second transistor in response to the voltage of the second signal not being greater than the threshold voltage, and wherein the parametric selection circuit is operable to select between a plurality of parameters of the controller based at least in part on an output of the first transistor, wherein the first transistor is configured to output a sinking current having a first value during a selection condition when a diode is not coupled between the first terminal and the second terminal, and wherein the first transistor is configured to output the sinking current having a second value during the selection condition when the diode is coupled between the first terminal and the second terminal, a cathode of the diode being coupled to the second terminal when the diode is coupled between the first terminal and the second terminal.

22. The controller of claim 21, wherein the parametric selection circuit comprises a comparator coupled to receive the second signal and a reference signal having the threshold voltage.

23. The controller of claim 22, wherein the parametric selection circuit further comprises a latch coupled to receive an output of the comparator, wherein the latch is operable to output a selection signal representative of a selected parameter.

24. The controller of claim 21, wherein the parametric selection circuit is operable to select a first parameter of the plurality of parameters when the sinking current has the first value, and wherein the parametric selection circuit is operable to select a second parameter of the plurality of parameters when the sinking current has the second value.

* * * * *